United States Patent
Wennerström

(10) Patent No.: US 11,578,885 B2
(45) Date of Patent: Feb. 14, 2023

(54) AIR TREATMENT DEVICE FOR A VENTILATION AIR INLET

(71) Applicant: Blueair AB, Stockholm (SE)

(72) Inventor: Johan Daniel Wennerström, Sollentuna (SE)

(73) Assignee: Blueair AB, Stockholm (SE)

(*) Notice: Subject to any disclaimer, the term of this patent is extended or adjusted under 35 U.S.C. 154(b) by 386 days.

(21) Appl. No.: 16/759,070

(22) PCT Filed: Oct. 30, 2018

(86) PCT No.: PCT/EP2018/079736
§ 371 (c)(1),
(2) Date: Apr. 24, 2020

(87) PCT Pub. No.: WO2019/086471
PCT Pub. Date: May 9, 2019

(65) Prior Publication Data
US 2020/0370768 A1    Nov. 26, 2020

(30) Foreign Application Priority Data

Oct. 30, 2017    (SE) .................................... 1751342-5

(51) Int. Cl.
*F24F 8/80* (2021.01)
*B01D 46/00* (2022.01)
(Continued)

(52) U.S. Cl.
CPC ............ *F24F 8/80* (2021.01); *B01D 46/0032* (2013.01); *B01D 46/0043* (2013.01);
(Continued)

(58) Field of Classification Search
CPC ...... F24F 8/10; F24F 8/108; F24F 8/30; F24F 7/007; F24F 11/75; F24F 11/77;
(Continued)

(56) References Cited

U.S. PATENT DOCUMENTS

| 2,043,934 A | * | 6/1936 | Spear | .................. | F24F 7/013 |
|  |  |  |  |  | 454/329 |
| 5,489,238 A | * | 2/1996 | Asselbergs | .............. | F24F 7/013 |
|  |  |  |  |  | 454/329 |

(Continued)

FOREIGN PATENT DOCUMENTS

| CN | 101149175 | 3/2008 |
| CN | 102307446 | 1/2012 |

(Continued)

OTHER PUBLICATIONS

CN106642489A_ENG (Espacenet machine translation of Mao) (Year: 2017).*

(Continued)

*Primary Examiner* — Jonathan Miller
*Assistant Examiner* — Gabriel E Gitman
(74) *Attorney, Agent, or Firm* — Carter, Deluca & Farrell LLP; George Likourezos

(57) ABSTRACT

An air treatment device includes a casing with an air inlet and an air outlet. Air flows through the casing and an air treatment section in the casing. The air treatment section includes a fan for generating a flow of air from the air inlet to the air outlet, a filtering means arranged within the flow of air, a first pressure sensor to measure a first pressure in the flow of air, a second pressure sensor to measure a second pressure in a room or cabin surrounding the air treatment device, and a control unit. The control unit is configured to adapt a speed of the fan based on the measured first pressure and the measured second pressure to control a flow of air through the air treatment device.

19 Claims, 4 Drawing Sheets

(51) Int. Cl.
| | |
|---|---|
| *B01D 46/44* | (2006.01) |
| *F24F 11/75* | (2018.01) |
| *B01D 46/46* | (2006.01) |
| *B03C 3/155* | (2006.01) |
| *B03C 3/36* | (2006.01) |
| *B03C 3/41* | (2006.01) |
| *B03C 3/45* | (2006.01) |
| *F24F 7/007* | (2006.01) |
| *F24F 8/10* | (2021.01) |
| *F24F 7/013* | (2006.01) |
| *F24F 7/06* | (2006.01) |
| *F24F 8/108* | (2021.01) |
| *F24F 8/30* | (2021.01) |
| *F24F 11/77* | (2018.01) |

(52) U.S. Cl.
CPC ........... *B01D 46/446* (2013.01); *B01D 46/46* (2013.01); *B03C 3/155* (2013.01); *B03C 3/368* (2013.01); *B03C 3/41* (2013.01); *B03C 3/45* (2013.01); *F24F 7/007* (2013.01); *F24F 7/013* (2013.01); *F24F 7/06* (2013.01); *F24F 8/10* (2021.01); *F24F 8/108* (2021.01); *F24F 11/75* (2018.01); *B01D 2279/40* (2013.01); *B01D 2279/50* (2013.01); *F24F 8/30* (2021.01); *F24F 11/77* (2018.01)

(58) Field of Classification Search
CPC ........ F24F 2110/40; F24F 13/20; F24F 13/28; F24F 1/0073; F24F 7/06; F24F 7/065; F24F 7/013; B01D 46/0005; B01D 46/0032; B01D 46/004; B01D 46/10; B01D 46/446; B01D 46/46; B01D 2279/40; B01D 2279/50; B01D 35/30; B03C 3/155; B03C 3/368; B03C 3/41; B03C 3/45; Y02B 30/70
See application file for complete search history.

(56) References Cited

U.S. PATENT DOCUMENTS

| | | | |
|---|---|---|---|
| 9,182,137 B1 | 11/2015 | Gardella | |
| 10,258,918 B2 | 4/2019 | Maekipaeae et al. | |
| 2003/0157882 A1* | 8/2003 | Boulanger | F24F 11/75 |
| | | | 454/256 |
| 2006/0240764 A1 | 10/2006 | Pierce | |
| 2007/0275651 A1 | 11/2007 | Palmer | |
| 2011/0171075 A1* | 7/2011 | Loreth | A61L 9/22 |
| | | | 422/121 |
| 2012/0071079 A1 | 3/2012 | Palmer | |
| 2012/0094590 A1 | 4/2012 | Lee | |
| 2017/0350607 A1* | 12/2017 | Chang | F24F 13/20 |

FOREIGN PATENT DOCUMENTS

| | | | | |
|---|---|---|---|---|
| CN | 102778010 | | 11/2012 | |
| CN | 106051998 A | * | 10/2016 | ............. F24F 11/00 |
| CN | 106524299 | | 3/2017 | |
| CN | 106642489 A | * | 5/2017 | ............. A61L 9/015 |
| EP | 2072925 | | 6/2009 | |
| EP | 3147581 | | 3/2017 | |
| JP | 5217891 | | 6/2013 | |

OTHER PUBLICATIONS

CN106051998A_ENG (Espacenet machine translation of Fu) (Year: 2016).*
Search report and Written Opinion in PCTEP2018079736; dated Jan. 24, 2019.
IPRP2 in PCTEP2018079736; Apr. 10, 2019.

\* cited by examiner

AIR TREATMENT DEVICE FOR A VENTILATION AIR INLET

TECHNICAL FIELD

The present invention generally relates to air treatment devices, and specifically to an air treatment device for use in combination with a ventilation air inlet, or an air conditioning device.

BACKGROUND

Different types of air treatment devices are frequently used for cleaning air from pollutants. Air pollution levels are increasing all over the world, especially in urban areas. In larger cities where traffic congestions sometimes may severely reduce the quality if the air, people often feel a need for air purification to protect themselves from inhaling smog or other forms of aerial pollutions.

One common way of cleaning air is to use an air treatment device placed in a room. A drawback with such air treatment devices is that the pollutants from outside enter the room before being removed by the air treatment device. Further, in order to keep all the air of a room relatively clean, the air treatment device may consume a lot of energy and may make noise, which may be disturbing to a person in the room.

Another alternative is to have an air treatment device arranged in the ventilation, or to have filters in the ventilation system. However, maintaining such filters may be difficult and is easily forgotten.

Hence, there is a need for improved air purification for a room.

SUMMARY

It would be advantageous to achieve an air treatment device for a room at least alleviating the above mentioned drawbacks. To better address one or more of these concerns an air treatment device as defined in the independent claim is provided. Preferable embodiments are defined in the dependent claims.

Hence, according to an aspect, an air treatment device is provided. The air treatment device is intended to be arranged at a ventilation air inlet of a room or a cabin, at an air inlet or an air outlet of an air conditioning device. The air treatment device comprises:
  a casing having an air inlet side and an air outlet side, said casing comprising an air inlet arranged on the air inlet side and an air outlet arranged on the air outlet side of the casing, such that air from the ventilation air inlet of the room or cabin, or air to the air inlet of the air conditioning device, or air from the air outlet of the air conditioning device is lead through the casing;
  an air treatment section arranged in the casing, said air treatment section comprising:
    a fan for generating a flow of air from the air inlet to the air outlet; and
    filtering means arranged such that the flow of air passes through the filtering means;
  a first pressure sensor adapted to measure a first pressure in the flow or air into, or out from, the air treatment device;
  a second pressure sensor adapted to measure a second pressure in the room or cabin surrounding the air treatment device outside the flow or air into, or out from, the air treatment device; and
  a control unit;
wherein the control unit is configured to adapt the speed of the fan, based on the detected first pressure and the detected second pressure, to generate a flow of air through the air treatment device corresponding to the flow of air from the ventilation air inlet to the room or cabin, or the flow of air to or from the air conditioning device.

With this air treatment device, treated or cleaned air from the ventilation system of a building structure or vehicle may be provided to the room or cabin with less contamination than air already in the room, and may have an easier installation and service than a ventilation air filter. The air treatment device according to the invention could furthermore be used in combination with an air conditioning device arranged to either heat or cool air within the room or cabin.

The ventilation air inlet allows air to enter into the room from outside of the room. The air enter from the ventilation inlet to the air treatment device according to the invention. The flow of air created by the fan in the air treatment section is drawn from the space between the ventilation air inlet and the air treatment device and prevents that air from the ventilation system enters the room. The flow of air also pass through a filtering means in the air treatment section where particles are removed before the treated air is passed via the air outlet into the room, thereby providing the room with treated air with less particles and pollutants than directly from the ventilation air inlet. In this way, the air treatment may be more efficient in comparison to previous solutions, such as an air treatment device arranged separately in the room.

The claimed air treatment device could furthermore be arranged in combination with an air conditioning device. The air treatment device is either arranged upstream, or downstream, the air conditioning device to remove particles in the conditioned air distributed by the air conditioning device.

If the air treatment device according to the invention is arranged upstream the flow of air through the air conditioning device, the amount of the particles settled on different surfaces within the air conditioning device is reduced considerably which is advantageous since the reduced efficiency of the conditioning device due to settled particles on for example the heat exchanger element will be delayed, i.e. the energy efficiency is improved over time.

The control unit of the air treatment device is configured to, based on the detected first and second pressure adapt the speed of the fan such that the air flow through the air treatment device correspond to the flow into the room or cabin or through the air conditioning device not to limit or reduce the intended and desired flow of air.

The air treatment device is configured to measure a pressure difference between the pressure in the flow or air into, or out from, the air treatment device and the pressure in the room outside the flow of air through the air treatment device and adapt the speed of the fan based on the detected difference in pressure.

In this way, the flow of air through the casing may be adapted to the flow of air from the ventilation inlet or through the air conditioning device. The air treatment section may be configured to adapt the speed of the fan such that substantially all air from the ventilation inlet or air conditioning device is moved by the fan into the casing, i.e. the first pressure and the second pressure may be approximately the same.

In the present specification, the term "ventilation air inlet" is to be interpreted as an air ventilation inlet of a room or cabin. It may be a forced ventilation air inlet, i.e. air is moved by an air moving means to enter the room or cabin, or it may be an opening. The air entering through the ventilation may have been filtered or treated to remove pollutants or particles, or it may be untreated.

With "filtering means" it is meant any means for filtering air, i.e. means for removing particles or pollutants from a flow of air.

In one embodiment of the air treatment device, the control unit is configured to control the speed of the fan and the flow of air such that the first pressure and second pressure are approximately equal. The first pressure and the second pressure being approximately equal indicates that the pressure in the flow or air into, or out from, the air treatment device is approximately the same as the pressure in the room outside of the enclosed space. That is, there is no overpressure or underpressure in the in the flow or air into, or out from, the air treatment device. In this way, air may be drawn into the casing by the fan in the same pace as air is entering through the ventilation air inlet or passing through the air condition device.

This allows for treating substantially all air that enters the room or cabin, or is conditioned by the air conditioning device which may provide cleaner air in the room.

In one embodiment of the air treatment device, the air treatment section further comprises an ionizing unit arranged at the air inlet to ionize particles in the air flowing into the casing. The ionizing unit may ionize particles so that they may be filtered out of the air flowing through the air treatment device more efficiently. Having the ionizing unit ionize particles at the inlet of the casing allows for having a lower grade filter media while still providing high filtration efficiency, as it may be easier for the filter to filter charged particles in comparison to uncharged particles.

In one embodiment of the air treatment device, the ionizing unit comprises: a collector electrode arranged around the air inlet; and an emitter electrode arranged at the center of the inlet. The collector electrode may in this way be arranged so that all air passing through the inlet passes the collector electrode, which allows for more efficient ionization of the particles in the air flow. Having the emitter electrode arranged at the center of the inlet may mean that the maximum distance to the collector electrode is minimized, which may lead to a more efficient ionization of the air flow.

In one embodiment of the air treatment device, the ionizing unit is arranged upstream from the filtering means. This is advantageous, for example, in that the ionizing unit may charge particles in the air flow, which may increase the likelihood for the particles to be subsequently trapped by the filtering means.

In one embodiment of the air treatment device, the filtering means comprises particulate matter filter media, molecule filtration media, or a combination thereof. This allows for filtering out particles and ionized particles, if any, from the flow of air passing through the filtering means.

In one embodiment of the air treatment device, the casing comprising a protruding portion extending from the air inlet side around the air inlet in the casing, said protruding portion is adapted to enclose the ventilation air inlet of the room, or the air outlet of the air conditioning device, to form an at least partly enclosed space such that air from the ventilation air inlet of the room, or air from the air outlet of the air conditioning device, enters the enclosed space before it continues into the air treatment device, said first pressure sensor is arranged to measure the pressure within the at least partly enclosed space. The "protruding portion" may be understood as a portion extending from the inlet side of the casing such that it may enclose a ventilation air inlet of a room or cabin, or the outlet from the air conditioning device. It has been realized that by enclosing the ventilation air inlet, air may be treated on its way into the room rather than when already in the room. By having a protruding portion extending from the back side of the casing, the air treatment device may be used on a variety of ventilation air inlets, and do not have to be adapted to the design of the outside of the ventilation air inlet, or be adapted to be inserted into a ventilation air inlet. This makes it easier to install the air treatment device in a room, since no or only minor customization is needed.

In one embodiment of the air treatment device, the protruding portion has at least one opening for allowing air to flow in and out from the enclosed space. The at least one opening in the protruding portion allows air to flow in and out from the enclosed space. This may be beneficial in case the fan is not calibrated to move the exact amount of air the ventilation air inlet or conditioning device outlet supplies, which may be very common as such a calibration may be difficult to perform, and the flow of air from the ventilation inlet or conditioning device outlet may differ from time to time. In this way, if the ventilation inlet, or air conditioning device outlet supplies more air than the air treatment device can treat, air will flow out of the enclosed space through at least one opening, thereby avoiding partly blocking the ventilation air inlet. Similarly, if the ventilation inlet supplies less air than the fan may move, air may be drawn from the room outside of the enclosed space through the at least one opening. It has also been realized that by providing the protruding portion with openings, the risk of blocking or overloading the existing ventilation is decreased. This allows the air treatment device may be used on any type of ventilation air inlet, such as draft ventilation or on forced ventilation. Because of the openings, there is no risk to block the ventilation air inlet, since air may flow or exit through the openings. This may be beneficial, for example, in case of a malfunctioning of the fan, or because a user of the air treatment device wants to turn it off.

Similarly, because of the openings, there is no risk of creating an underpressure in the enclosed space defined by a wall and the protruding portion, since air may enter through the openings. The risk of overloading the fan, the ventilation system or the air conditioning device, for example by drawing too much air from the ventilation and thereby impairing ventilation in other rooms also connected to the ventilation, is thereby decreased.

In one embodiment of the air treatment device, the control unit is configured to adapt the speed of the flow of air such the first pressure is lower than the second pressure, thereby causing air to be drawn from the room through the at least one opening in the protruding portion. In this way, air from the room may be drawn into the casing and the air treatment section, and thereby being treated before entering the room. In addition to air entering the room through the ventilation inlet, air from the room may be treated as well. This may decrease the amount of pollutants or particles in the air already in the room.

In one embodiment of the air treatment device, the casing further comprises at least one casing side wall (130) arranged between a front side and the inlet side, and wherein the air outlet is arranged in the casing side wall. The casing side wall may be arranged between the front side and the back side. In this way, the casing may have a relatively large outlet. Further, by having the outlet on or around the casing side wall, furniture or other items may be placed in front of the air treatment device without impairing its function or the ventilation.

In one embodiment of the air treatment device, the filtering means is arranged in the at least one side wall of the casing, and/or in the front side of the casing. This may allow for having a larger filter area or a larger flow of air, i.e. the air treatment device may have a larger capacity, as the flow of air may exit the casing at a side wall of the casing and the side wall of the casing may have a larger area than for example, the front side of the casing. Having a larger area allows for having a larger a filtering means may be placed. This further allows for having a flatter air treatment device, which may be easier to mount in a room. Further, by moving air out of a side of the casing, furniture or other items may be placed in from the air treatment device without impacting its function or the ventilation.

In one embodiment of the air treatment device, the casing is box shaped with six side walls, and the air inlet and air outlet is arranged in opposite side walls of the casing. This embodiment is favorable when the air treatment device is used in combination with an air conditioning device since the flow of air is flowing straight through the air treatment device and the air conditioning device.

In one embodiment of the air treatment device, one side wall of the casing is intended to face a wall of the room or cabin and the air flow through the air treatment device is substantially parallel to the wall of the room. This embodiment is favorable when the air treatment device is used in combination with an air conditioning device since one side of the casing could be mounted to a supporting wall upstream air conditioning device and the flow of air flowing through the air treatment device and the air conditioning device substantially parallel to the wall.

In one embodiment of the air treatment device, the first sensor is arranged in the air outlet side that is intended to face the air inlet of the air conditioning device to measure the air pressure in the space between the air outlet side and the inlet of the air conditioning device. This embodiment is advantageous when the air treatment device is arranged upstream the air conditioning device to ensure that the control unit operates the fan at the required speed to provide the same flow of air through the air treatment device as the air conditioning device.

In one embodiment of the air treatment device, the casing comprises a protruding portion extending from the air outlet side around the air outlet in the casing, said protruding portion is intended to enclose the air outlet of the air treatment device to form an at least partly enclosed space such that air from the air treatment device enters the at least partly enclosed space before it continues into the air conditioning device, said first pressure sensor is arranged to measure the pressure within the at least partly enclosed space between the air treatment device and the air conditioning device Further objectives of, features of and advantages with the present invention will become apparent when studying the following detailed disclosure, the drawings and the appended claims. Those skilled in the art realize that different features of the present invention can be combined to create embodiments other than those described in the following.

BRIEF DESCRIPTION OF DRAWINGS

The invention will be better understood through the following illustrative and non-limiting detailed description of preferred embodiments, with reference to the appended drawings, on which.

All figures are schematic, not necessarily to scale, and generally only show parts which are necessary in order to elucidate the invention, wherein other parts may be omitted or merely suggested.

DETAILED DESCRIPTION

Figure 1:
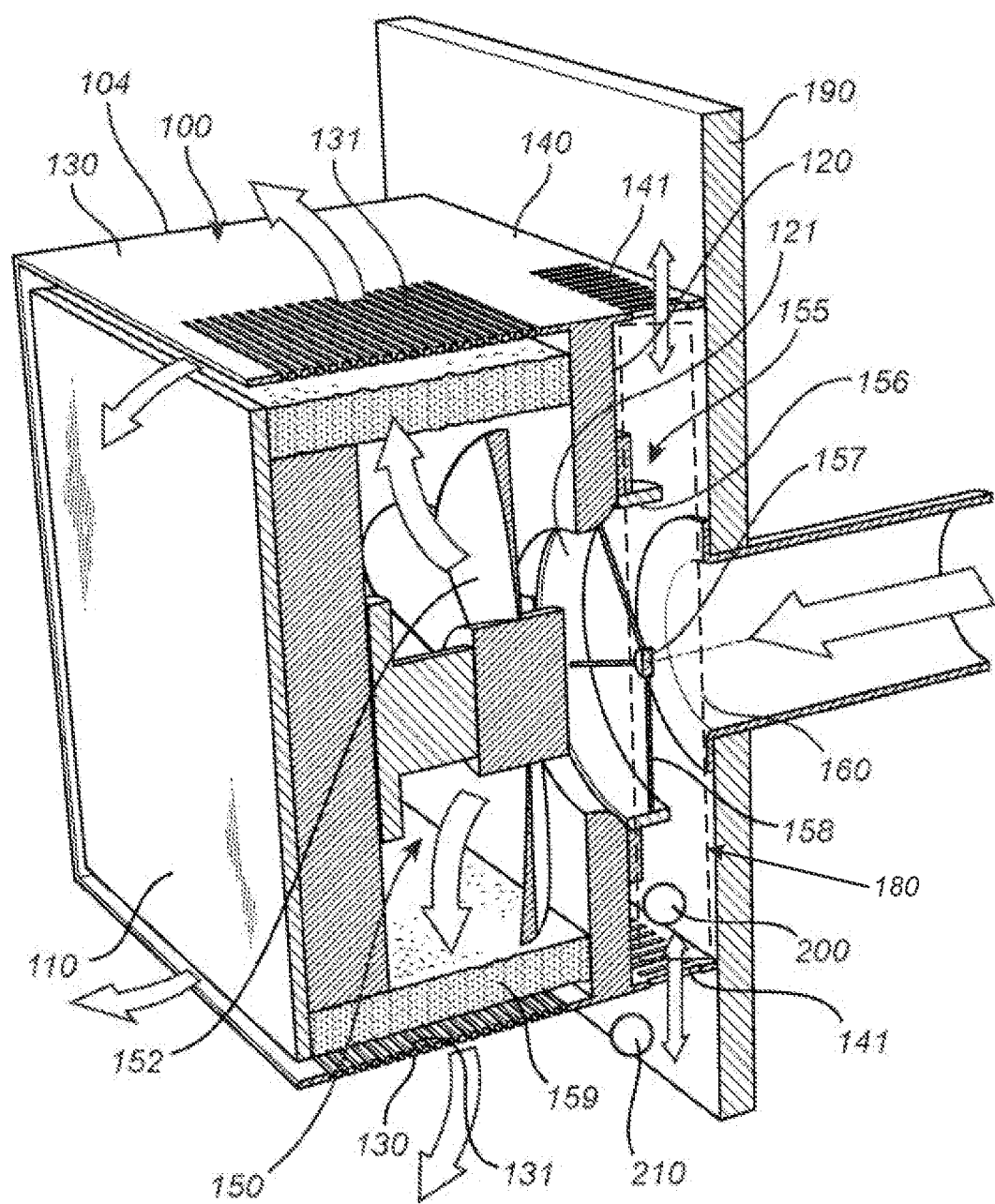
FIG. 1 shows a cross-section of an air treatment device according to a first embodiment.

A cross-section of an air treatment device according to a first embodiment is shown in FIG. 1.

The air treatment device 100 comprises a casing 104 with a front side 110, a back side 120, and four casing side walls 130 arranged between the front side 110 and the back side 120. The back side comprises an air inlet 121 and is also referred to as the inlet side of the casing. The casing side wall comprises an air outlet 131 and is also referred to as the outlet side of the casing.

The casing further comprises a protruding portion 140 extending from the inlet side 120. The protruding portion 140 is arranged to form an enclosed space 180 with a wall 190 when the air treatment device 100 is arranged against a wall 190. The protruding portion 140 has at least one opening 141 for allowing air to flow in and out from the enclosed space 180.

The casing may comprise different types of materials. Preferably at least one side comprises a rigid material, such as hard plastics, to support the air treatment section. Some sides may comprise softer materials. For example, the front side 110 may in some example comprise a fabric. The protruding portion 140 may comprise a rigid material, and/or a flexible material to enable forming an enclosed section 180 with a wall 190 even in case the wall 190 is uneven.

The air treatment device 100 is adapted to be arranged at a ventilation air inlet 160 arranged in a wall of a room or a cabin of a vehicle such that the protruding portion 140 is arranged at the wall 190 to form an enclosed space 180 enclosing the ventilation air inlet 160. The ventilation air inlet 160 may be any type of ventilation air inlet. The air entering the room via ventilation air inlet 160 enters into the enclosed space 180 formed by the wall 190, the inlet side 120 and the protruding portion 140.

The air treatment device 100 further comprises an air treatment section 150. The air treatment section 150 comprises a fan 152 configured to create a flow of air from the inlet 121 to the outlet 131. The air treatment device 100 further comprises a filtering means 159 for filtering particles from the flow of air created by the fan 152. The filtering means 159 is in this example arranged at the outlet 131 at the casing side wall 130, but the filtering means 159 may be arranged in any way such that the flow of air passes through the filtering means 159. For example, the filtering means 159 may be arranged at the inlet 121.

The filtering means 159 may comprise a particulate matter filter media, molecule filtration media, or a combination thereof.

Optionally, the air treatment section 150 may also comprise an ionization unit 155. The ionization unit 155 comprises an emitting electrode 157 arranged at the center of the air inlet 121 and a collecting electrode 156 arranged around the air inlet 121. The emitting electrode 157 may be arranged on a support portion 158 to be in the center of the inlet. The support portion 158 may be arranged on the inlet side of the casing. The ionizing unit 155 may ionize particles in the flow of air created by the fan 152 so that they may be more easily filtered by the filtering means 159.

The ionizing unit 155 is in this example arranged upstream from the fan 152 arranged in the casing. However, the ionization unit 155 may alternatively be arranged downstream from the fan 152.

The air treatment device 100 may function as follows. A flow of air enters into the enclosed space 180 through the ventilation air inlet 160. At least some of the air is drawn into the casing and through the air treatment section 150 by the fan 152. The flow of air created by the fan passes through the ionizing unit 155, which, in this example, is arranged at the air inlet 121. The ionizing unit 155 ionizes the particles. The flow of air passes through the filtering means 159 where particles are filtered. The treated air exists the casing through the outlet 131 into the room.

The air treatment device may further comprise a first pressure sensor 200 adapted to measure a first pressure in the enclosed space 180, and a second pressure sensor 210 adapted to measure a second pressure in the room outside of the enclosed space 180. The pressure sensors 200, 210 may be any type of sensor suitable for measuring an air pressure in a room. In some examples the sensors are arranged in one unit, or there is only one sensor. In some examples, the air treatment device may comprise a differential pressure sensor capable of measuring a difference in pressure between the enclosed space 180 and the room outside of the enclosed space 180.

The air treatment 100 device further comprise a control unit (not shown in the figures) for controlling the function of the air treatment device 100. For example, the control unit may control the speed of the fan 152, or the control unit may process the measurements from the sensors 200, 210 or based on a determined difference in pressure between the enclosed space 180 and the room outside of the enclosed space 180. The control unit may, for example, comprise a processing means, such as microcontroller.

The air treatment section 150 may be configured to adapt the speed of the fan 152, i.e. how much air is drawn from the enclosed space 180 into the casing, based on the detected first pressure and the detected second pressure.

For example, the speed of the fan 152 may be decreased if the second pressure is higher than the first pressure, i.e. if the pressure in the room is higher than the pressure in the enclosed section, as this indicates that the fan may be creating a flow of air larger than the flow provided by the ventilation air inlet 160 and may be drawing air both from the ventilation air inlet 160 and from the room. In another example, the speed of the fan 152 may be increased if the second pressure is lower than the first pressure, i.e. if the pressure in the room is lower than in the enclosed portion 180. This may indicate that the ventilation air inlet 160 provides more air than the flow created by the fan 152 into the casing. To avoid untreated air entering the room, the speed of the fan 152 may hence be increased.

However, in some settings drawing air from the room and treat it may be beneficial. For example, if the air treatment device 100 has been turned off for some time, a window has been opened, or particles or pollutants have entered the room in another way. This may be regulated by a user by a control unit for the air treatment device. This will be described with more detail below with reference to FIG. 2A and FIG. 2B.

Figure 2A:
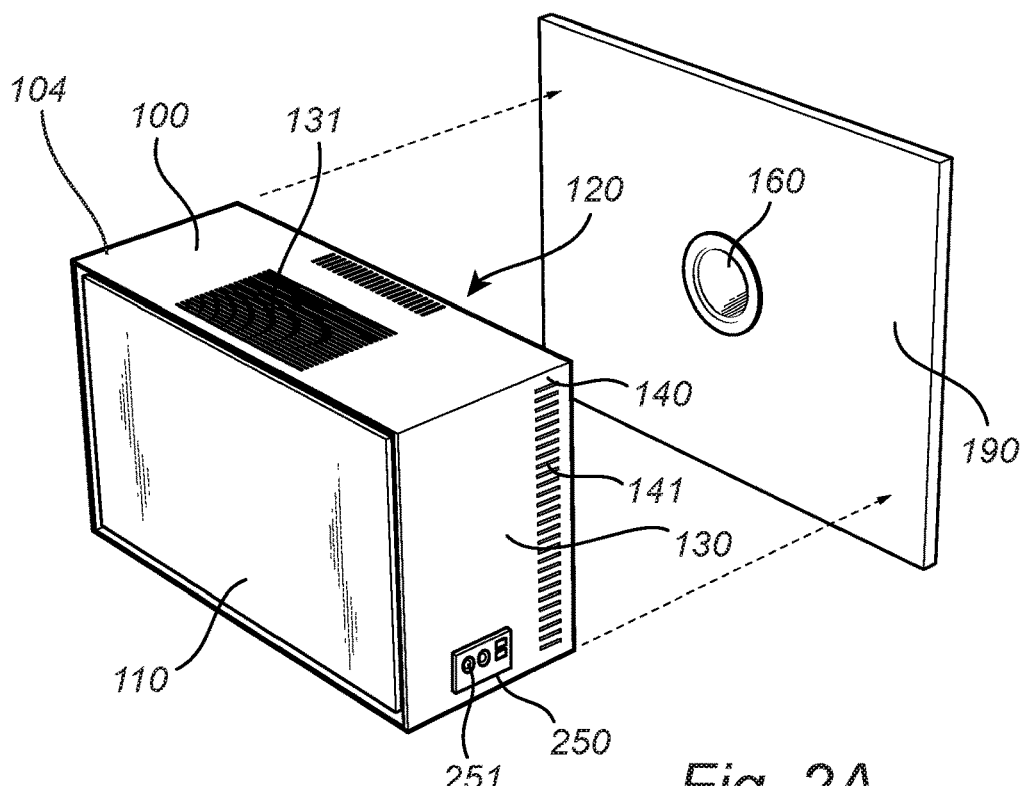
FIG. 2A shows a perspective view of the air treatment device to be mounted on a wall, according to the first embodiment.
Figure 2B:
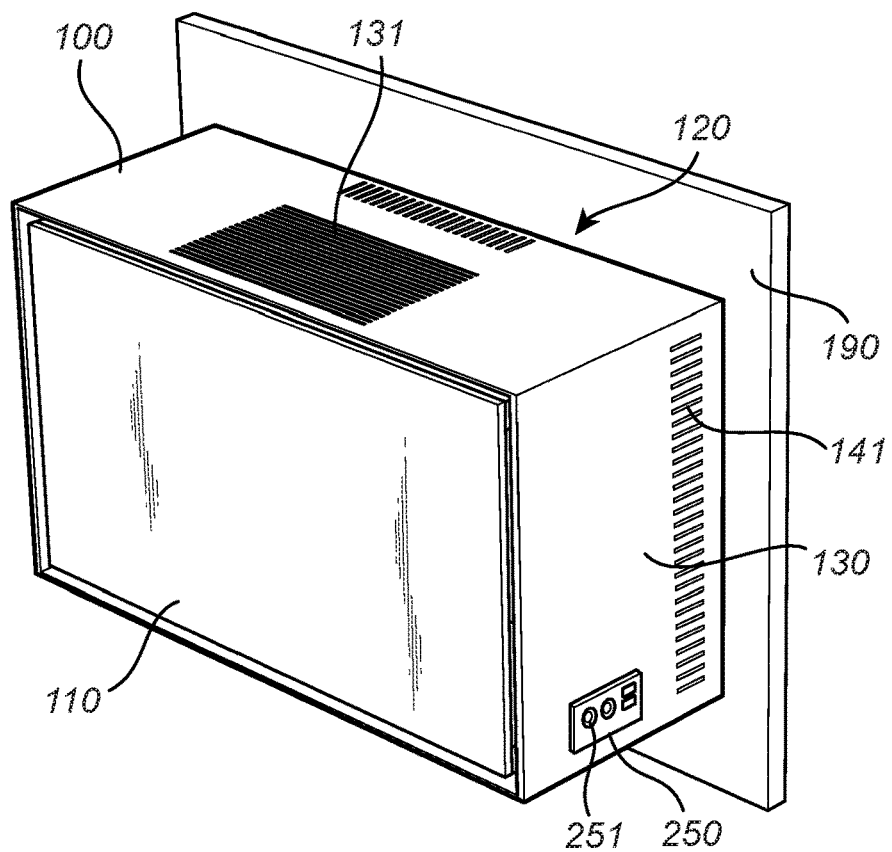
FIG. 2B is a perspective view of the air treatment device mounted on the wall, according to the first embodiment.

A perspective view of an air treatment device 100 is shown in FIG. 2A. FIG. 2B shows a perspective view of the air treatment device 100 shown in FIG. 2A arranged at the ventilation air inlet 160.

The air treatment device 100 is arranged to cover the ventilation air inlet 160. Air may, as described above exit the air treatment device through outlet 131.

The air treatment device comprises a control device 250 for controlling the operation of the air treatment device, for example, the speed of the fan (not shown in FIG. 2A or 2B) or turning the device on or off. The control device may comprise at least one button 251 for allowing a user to operate the air treatment device 100. Alternatively, the control device 250 may be connected to a remote control to allow a user to operate the air treatment device 100.

Figure 3A:
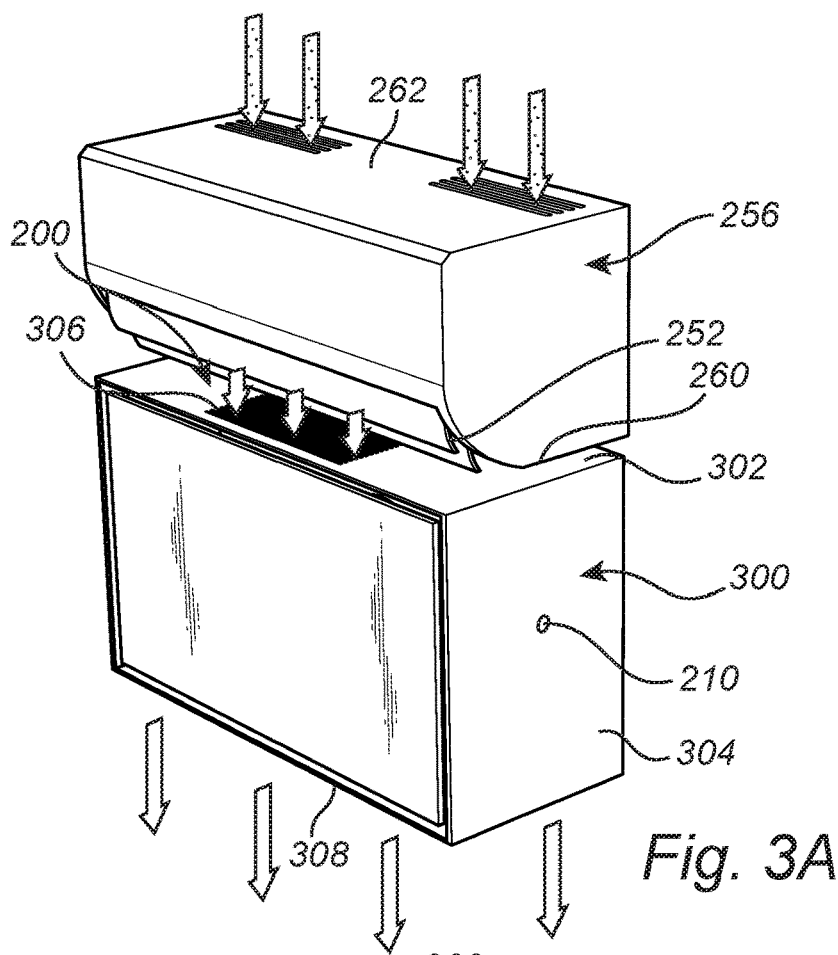
FIG. 3A illustrates a perspective view of a second embodiment of the air treatment device arranged on the downstream side of an air conditioning device.

FIG. 3A illustrates a perspective view of a second embodiment of the air treatment device 300. This embodiment of the air treatment device is adapted for use in combination with an air conditioning device 256 that is intended to circulate air within for example a room to either heat or cool the air to a desired temperature. The illustrated second embodiment of the air treatment device 300 is intended to be arranged on the downstream side of the air conditioning device, i.e. the conditioned air exhausted from the air condition device is directed towards the air treatment device 300 in order to reduce the number of particles in the air in the room.

In this embodiment of the air treatment device the inlet side 302 of the casing 304 is the side surface facing the air outlet 252 if the air condition device. The air inlet 306 of the air treatment device 300 is arranged in the inlet side 302 of the casing, and the air outlet (not visible in FIG. 3A) is arranged in the outlet side 308 on the opposite side of the box shaped casing as the inlet side. The box shaped casing could also be embodied with outlets in the remaining two side surfaces to make it possible to increase the filter area arranged in the side walls. This embodiment of the air treatment device comprises the same type of air treatment section and components as the first embodiment described in detail above arranged within the casing to ensure the desired purification of the air flowing through the air treatment device.

Figure 3B:
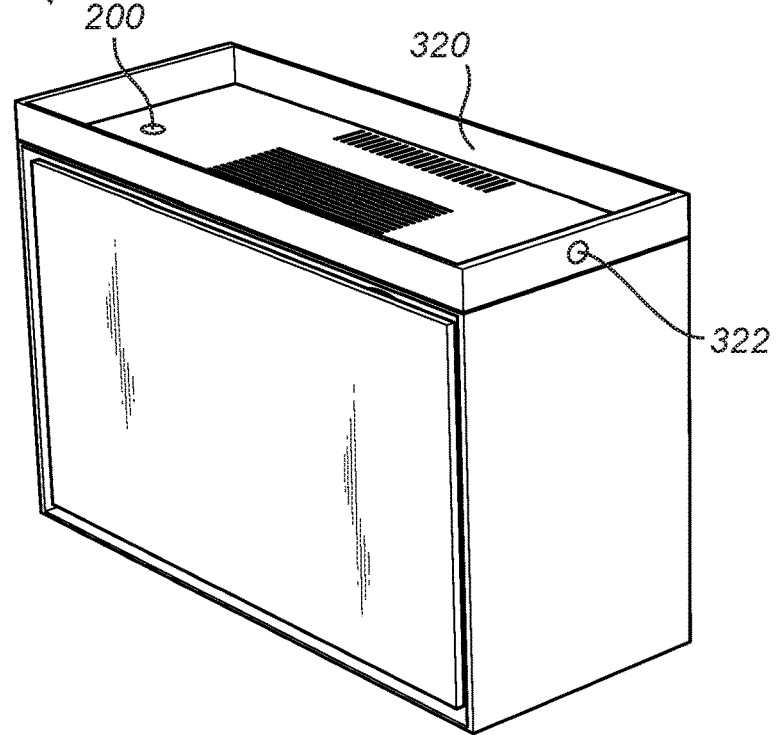
FIG. 3B illustrates an alternative casing design for this embodiment.

This second embodiment of the air treatment device could comprise a slightly modified casing illustrated in FIG. 3B. The casing illustrated in FIG. 3B comprises a similar protruding portion as the first embodiment described above. The protruding portion 320 is arranged to form an at least partly enclosed space together with an outlet casing wall 260 of the air conditioning device 252 when the air treatment device 300 is arranged in the intended position adjacent to the air conditioning device 252. The protruding portion3 20 could also in this embodiment comprise at least one opening 322 for more easily allowing air to flow in and out from the at least partly enclosed space.

The air treatment device comprises the first pressure sensor 200, adapted to measure the first pressure in the at least partly enclosed space for the control unit to be able to adapt the speed of the fan such that the flow of air through the air treatment device correspond to the flow through the air conditioning device.

The protruding portion of the air treatment device is preferably arranged close to the outlet casing wall of the air conditioning device to ensure that as much air as possible exhausted by the conditioning device continues into the air treatment device, i.e. the distance between the outer edge of the protruding portion and the air conditioner casing should not exceed 30 mm.

Figure 4A:
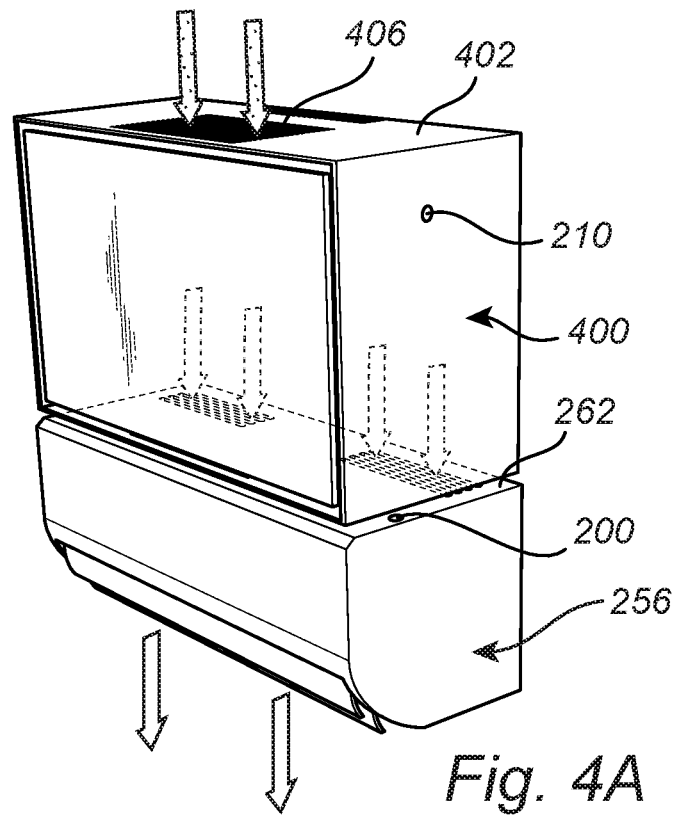
FIG. 4A illustrates a perspective view of a third embodiment of the air treatment device arranged on the upstream side of an air conditioning device.
Figure 4B:
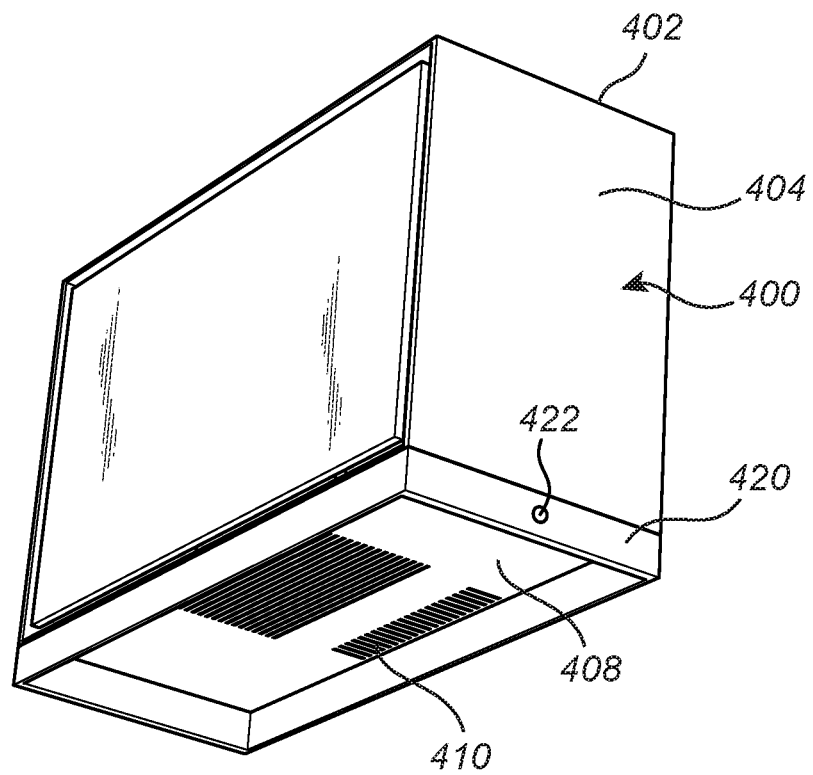
FIG. 4B illustrates an alternative casing design for this embodiment.

FIGS. 4A and 4B illustrate a perspective view of a third embodiment of the air treatment device 400 intended to be positioned on the upstream side of an air conditioning device 252 arranged to circulate air to condition the air temperature. The illustrated third embodiment of the air treatment device is intended to be arranged on the upstream side of the air conditioning device, i.e. the air is first flowed through the air inlet 406 of the air treatment device and the air treatment device before it enters the air condition device. In this embodiment of the air treatment device, the air outlet 10 and the outlet side of the casing are facing the air inlet of the air condition device. The air outlet 410 is arranged in the outlet side 408 opposite to the inlet side 402 of the box shaped casing 404. This embodiment of the air treatment device comprises the same components as the first and second embodiment described above.

In this embodiment of the air treatment device, the first pressure sensor 200 is adapted to measure the first pressure in the space between the outlet side 408 of the air treatment device and the air inlet wall 262 of the air conditioning device in order to make it possible for the control unit to adapt the speed of the fan such that the flow of air through the air treatment device correspond to the flow of air through the air conditioning device.

This third embodiment could comprise a protruding portion 420 extending from the outlet side 408 of the casing to direct the flow of air from the air treatment device towards the air inlet of the air conditioning device. The protruding portion 420 is arranged to form an at least partly enclosed space with the inlet casing wall of the air conditioning device when the air treatment device 400 is arranged in the intended position adjacent to the air conditioning device. If the casing is provided with the protruding portion, the first pressure is measured in the at least partly enclosed space defined within the protruding portion and the outlet side of the casing. The protruding portion could also in this embodiment comprise at least one opening 422 for more easily allowing air to flow in and out from the at least partly enclosed space for the same reasons that has been presented above.

The outlet side of the air treatment device, or the edge of the protruding portion of the air treatment device if the device is provided with this, is preferably arranged close to the inlet casing wall of the air conditioning device to ensure that as much or the purified air from the air treatment device continues into the air conditioning device, i.e. the distance between the outlet side of the casing or the outer edge of the protruding portion and the air conditioner casing should not exceed 30 mm.

While the invention has been illustrated and described in detail in the drawings and foregoing description, such illustration and description are to be considered illustrative or exemplary and not restrictive; the invention is not limited to the disclosed embodiments. The skilled person understands that many modifications, variations and alterations are conceivable within the scope as defined in the appended claims.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. An air treatment device configured to be arranged at a ventilation air inlet of a room or cabin or an air outlet of an air conditioning device, the air treatment device comprising:
   a casing having an air inlet side and an air a casing having an air inlet side and an air outlet side, the casing comprising-an-a casing air inlet arranged on the air inlet side and a casing air outlet arranged on the air outlet side of the casing, such that air from the ventilation air inlet of the room or cabin or air from the air outlet of the air conditioning device flows through the casing;
   an air treatment section arranged in the casing, the air treatment section comprising:
      a fan for generating a flow of air from the casing air inlet to the casing air outlet;
      filtering means arranged such that the flow of air passes through the filtering means;
      a first pressure sensor adapted to measure a first pressure in the flow of air into the air treatment device;
      a second pressure sensor adapted to measure a second pressure in the room or cabin surrounding the air treatment device outside the flow of air into, or out from, the air treatment device; and
      a control unit;
   wherein the control unit is configured to adapt a speed of the fan, based on the measured first pressure and the measured second pressure, to control the flow of air from the casing air inlet to the casing air outlet of the air treatment device corresponding to a flow of air from the ventilation air inlet to the room or cabin, or a flow of air from the air conditioning device, and wherein the casing comprises a protruding portion extending from the air inlet side around the air inlet of the casing, wherein the protruding portion is adapted to enclose the ventilation air inlet of the room or cabin, or the air outlet of the air conditioning device, to form an at least partly enclosed space such that air from the ventilation air inlet of the room or cabin, or air from the air outlet of the air conditioning device, enters the at least partially enclosed space before flowing into the air treatment device, wherein the first pressure sensor is arranged to measure the pressure within the at least partly enclosed space, and wherein the protruding portion has at least one opening for allowing air to flow in and out from the at least partially enclosed space.

2. The air treatment device according to claim 1, wherein the control unit is configured to control the speed of the fan and the flow of air such that the first pressure and second pressure are equal.

3. The air treatment device according to claim 1, wherein the air treatment section further comprises an ionizing unit arranged at the casing air inlet to ionize particles in the air flowing into the casing.

4. The air treatment device according to claim 3, wherein the ionizing unit comprises:
   a collector electrode arranged around the casing air inlet; and
   an emitter electrode arranged at the center of the casing air inlet.

5. The air treatment device according to claim 3, wherein the ionizing unit is arranged upstream from the filtering means.

6. The air treatment device according to claim 1, wherein the filtering means comprises particulate matter filter media, molecule filtration media, or a combination thereof.

7. The air treatment device according to claim 1, wherein the control unit is configured to adapt the speed of the flow of air such the first pressure is lower than the second pressure, thereby causing air to be drawn from the room through the at least one opening in the protruding portion.

8. The air treatment device according to claim 7, wherein the casing further comprises at least one casing side wall arranged between a front side and the casing air inlet side, and wherein the casing air outlet is arranged in the casing side wall.

9. The air treatment device according to claim 8, wherein the filtering means is arranged in the at least one side wall of the casing, and/-or in the front side of the casing.

10. The air treatment device according to claim 1, wherein the casing is box shaped with six side walls, and the casing air inlet and the casing air outlet are arranged in opposite side walls of the casing.

11. The air treatment device according to claim 10, wherein one side wall of the casing is configured to face a wall of the room or cabin and the air flow through the air treatment device is substantially parallel to the wall of the room.

12. An air treatment device configured to be arranged at an air inlet of an air conditioning device, the air treatment device comprising:
 a casing having an air inlet side and an air outlet side, the casing comprising a casing air inlet arranged on the air inlet side and a casing air outlet arranged on the air outlet side of the casing, such that air flows through the casing to the air inlet of the air conditioning device;
 an air treatment section arranged in the casing, the air treatment section comprising:
  a fan for generating a flow of air from the casing air inlet to the casing air outlet;
  filtering means arranged such that the flow of air passes through the filtering means;
  a first pressure sensor adapted to measure a first pressure in the flow of air out from the air treatment device, wherein the first sensor is arranged in the casing air outlet side that faces the air inlet of the air conditioning device to measure the air pressure in the space between the casing air outlet side and the inlet of the air conditioning device;
  a second pressure sensor adapted to measure a second pressure in the room or cabin surrounding the air treatment device outside the flow of air into, or out from, the air treatment device; and
  a control unit;
 wherein the control unit is configured to adapt a speed of the fan, based on the measured first pressure and the measured second pressure, to control the flow of air from the casing air inlet to the casing air outlet of the air treatment device corresponding to a flow of air to the air conditioning device.

13. The air treatment device according to claim 12, wherein the casing comprises a protruding portion extending from the casing air outlet side around the casing air outlet, the protruding portion is configured to enclose the casing air outlet of the air treatment device to form an at least partly enclosed space such that air from the air treatment device enters the at least partly enclosed space before flowing into the air conditioning device, and wherein the first pressure sensor is arranged to measure the pressure within the at least partly enclosed space between the air treatment device and the air conditioning device.

14. The air treatment device according to claim 12, wherein the control unit is configured to control the speed of the fan and the flow of air such that the first pressure and second pressure are equal.

15. The air treatment device according to claim 12, wherein the air treatment section further comprises an ionizing unit arranged at the casing air inlet to ionize particles in the air flowing into the casing.

16. The air treatment device according to claim 15, wherein the ionizing unit comprises:
 a collector electrode arranged around the casing air inlet; and
 an emitter electrode arranged at the center of the casing air inlet.

17. The air treatment device according to claim 12, wherein the filtering means comprises particulate matter filter media, molecule filtration media, or a combination thereof.

18. The air treatment device according to claim 13, wherein the protruding portion has at least one opening for allowing air to flow in to and out from the at least partially enclosed space.

19. The air treatment device according to claim 18, wherein the control unit is configured to adapt the speed of the flow of air such the first pressure is lower than the second pressure, thereby causing air to be drawn from the room through the at least one opening in the protruding portion.

* * * * *